J. W. Coburn,
Shoe Sole,
№ 53,523. Patented Mar. 27, 1866.
Fig: 1.
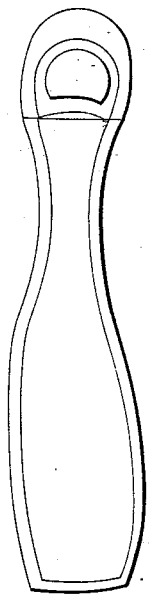
Fig: 2.
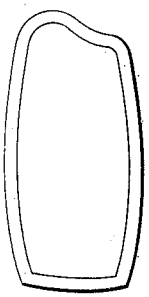
Fig: 3.
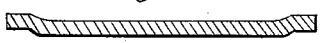
Fig: 4.
Fig: 5.
Fig: 6.
Fig: 7.
Witnesses:
M. A. King
John H. Shumway
Inventor:
John W. Coburn
by his atty
John E. Earl

UNITED STATES PATENT OFFICE.

JOHN W. COBURN, OF NEW HAVEN, CONNECTICUT, ASSIGNOR TO HIMSELF AND OLIVER F. CASE, OF SAME PLACE

IMPROVEMENT IN WATER-PROOF SOLES.

Specification forming part of Letters Patent No. 53,523, dated March 27, 1866.

*To all whom it may concern:*

Be it known that I, JOHN W. COBURN, of New Haven, in the county of New Haven and State of Connecticut, have invented a new and useful Improvement in Water-Proof Soles for Boots and Shoes; and I do hereby declare the following, when taken in connection with the accompanying drawings, and the letters of reference marked thereon, to be a full, clear, and exact description of the same, and which said drawings constitute part of this specification, and represent, in—

Figure 1, a view of a whole sole and heel; Fig. 2, a half-sole; Figs. 3 to 7, inclusive, transverse sections illustrating the manner of making my improved sole.

Combining leather and rubber to make a water-proof sole has long been done. At first the rubber sole was formed and secured to the outside of the sole by means of adhesive gums, which, from slight heat and many other causes, were easily started from the sole, to overcome which objection the rubber sole was placed upon the outside of the leather while in a plastic state, and there cured by baking, in the usual manner. In the latter the rubber sole was made smaller than the leather, leaving an edge by which to secure the sole to the boot. To both these constructions an objection was found to exist, in the fact that the rubber added too much to the thickness of the sole, and the edges, having no protection, were easily cut and unevenly worn. These objections suggested my improvement for which I obtained Letters Patent June 27, 1865, in which I united a leather edge only to the sole without the intervention of an insole. For thick or heavy work this is found to be the most desirable construction, but for light work, although equally desirable that it should be water-proof, it is not at all times desirable that the outer surface of the sole should be of rubber. To produce a sole which shall at the same time be water-proof and present a leather exterior is the object of my invention, which consists in forming the inner surface of the sole of rubber or any of its allied gums, and curing the said gum after it is placed upon the leather.

To enable others skilled in the art to construct and use my improvement, I will proceed to describe the same as illustrated in the accompanying drawings.

I first cut the sole, either whole sole, half-sole or heel, from common sole-leather, of the form required. I then, in dies prepared for the purpose, or by other means, compress the leather, as seen in Fig. 3, so as to form a depression in the upper or inner surface. This depression I fill with rubber or any of its allied gums, as seen in Fig. 4, prepared in the usual manner, and while in a plastic state; then place the sole thus covered within a die or case and place it in an oven for curing, in the usual manner for curing articles of rubber—*i. e.*, from 250° to 280° Fahrenheit, from six to eight hours—and when properly cured my sole is complete, and is to be secured to the boot or shoe in the usual manner, by pegs or stitches, and the sole is thus rendered water-proof. The exterior of the sole thus prepared presents a raised center, as seen in Figs. 1, 2, and 4. This is the form which I prefer to make, but the raised exterior is not a necessity, as the depression may be made, as seen in Fig. 5, without raising the exterior, and filled in like manner, as seen in Fig. 6; or, if preferred, the leather may be covered without forming a depression, as seen in Fig. 7. In all cases the rubber is placed upon the leather while in a plastic state, and cured after being so placed, by which process the leather and rubber are so firmly united as to form substantially but one piece, whereas were the rubber cured before being placed upon the leather it would require to be secured by means of adhesive gums, which when slightly heated detaches from the leather—the greatest objection which exists to the common rubber sole.

Having therefore thus fully described my improvement, what I claim as new and useful, and desire to secure by Letters Patent, is—

Coating the inside of the sole for boots and shoes with rubber or any of its allied gums, when prepared and united, substantially in the manner and for the purpose herein set forth.

JOHN W. COBURN.

Witnesses:
M. A. HINE,
JOHN H. SHUMWAY.